United States Patent
Kondo

(10) Patent No.: US 9,247,461 B2
(45) Date of Patent: *Jan. 26, 2016

(54) METHOD, SYSTEM OF PERFORMING HAND OVER WITHOUT ADDING INFORMATION OF FEMTO BASE STATION TO PERIPHERAL BASE STATION ANNOUNCEMENT INFORMATION IN A WIRELESS COMMUNICATION NETWORK

(71) Applicant: NEC CORPORATION, Tokyo (JP)

(72) Inventor: Takayuki Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/930,382

(22) Filed: Jun. 28, 2013

(65) Prior Publication Data

US 2013/0288684 A1 Oct. 31, 2013

Related U.S. Application Data

(63) Continuation of application No. 13/123,803, filed as application No. PCT/JP2009/005193 on Oct. 6, 2009, now Pat. No. 8,554,229.

(30) Foreign Application Priority Data

Oct. 20, 2008 (JP) .................................. 2008-269995

(51) Int. Cl.
*H04W 36/00* (2009.01)
*H04J 11/00* (2006.01)
(Continued)

(52) U.S. Cl.
CPC ........... *H04W 36/00* (2013.01); *H04J 11/0069* (2013.01); *H04J 11/0093* (2013.01);
(Continued)

(58) Field of Classification Search
CPC .............. H04J 11/0069; H04J 11/0093; H04J 2211/001; H04J 2211/005; H04W 36/00; H04W 48/08; H04W 48/16
USPC ........ 455/420, 422.1, 432.1–453, 456.1–457; 370/328, 329, 338, 331, 332, 310.2
See application file for complete search history.

(56) References Cited

U.S. PATENT DOCUMENTS 5,987,013 A 11/1999 Kabasawa
6,111,864 A 8/2000 Kabasawa
(Continued)

FOREIGN PATENT DOCUMENTS

CN 101030802 A 9/2007
JP 2007-151090 A 6/2007
(Continued)

OTHER PUBLICATIONS

International Search Report dated Dec. 22, 2009 issued by the International Searching Authority in counterpart International Application No. PCT/JP2009/005193.
(Continued)

*Primary Examiner* — Babar Sarwar
(74) *Attorney, Agent, or Firm* — Sughrue Mion, PLLC

(57) ABSTRACT

A communication system in which a primary base station or a secondary base station communicates with a mobile terminal. The primary base station sends the mobile terminal and the secondary base station an announcement signal which includes identification information for identifying a cell of the primary base station. When receiving the announcement signal, the secondary base station sends the mobile terminal a pseudo announcement signal which includes the identification information and adjacent cell information which includes information for a cell of the secondary base station. When receiving the announcement signal and the pseudo announcement signal, the mobile terminal compares a reception power of the signal received from the primary base station with that of the signal received from the secondary base station, and performs communication with one of the base stations which has higher power.

12 Claims, 10 Drawing Sheets

(51) Int. Cl.
*H04W 48/08* (2009.01)
*H04W 48/16* (2009.01)

(52) U.S. Cl.
CPC .......... *H04W48/08* (2013.01); *H04J 2211/001* (2013.01); *H04J 2211/005* (2013.01); *H04W 48/16* (2013.01)

(56) References Cited

U.S. PATENT DOCUMENTS

| | | |
|---|---|---|
| 6,757,538 B1 | 6/2004 | Howe |
| 6,862,447 B1 | 3/2005 | Solondz |
| 7,233,797 B2 | 6/2007 | Kanagawa |
| 2007/0086388 A1 | 4/2007 | Kang et al. |
| 2007/0099598 A1 | 5/2007 | Voyer et al. |
| 2008/0057956 A1 | 3/2008 | Black et al. |
| 2008/0320354 A1* | 12/2008 | Doppler et al. ............... 714/748 |
| 2012/0258711 A1* | 10/2012 | Bao et al. ....................... 455/434 |

FOREIGN PATENT DOCUMENTS

| | | | |
|---|---|---|---|
| JP | 2008-219645 A | 9/2008 | |
| JP | 5158204 B2 | 3/2013 | |
| KR | 20010017137 A | 3/2001 | |
| WO | 2008/016246 A1 | 2/2008 | |
| WO | 2008/055251 A2 | 5/2008 | |
| WO | 2009145302 A1 | 12/2009 | |

OTHER PUBLICATIONS

Office Action dated Apr. 2, 2013 issued by the Japanese Patent Office in counterpart Japanese Application No. 2012-225187.

Office Action dated May 24, 2013 issued by the State Intellectual Property Office of the People's Republic of China in counterpart Chinese Application No. 200980140783.0.

Communication dated Jun. 18, 2012 from the Korean Intellectual Property Office in counterpart Korean application No. 10-2011-7008642.

Extended European Search Report, dated Jan. 24, 2013, issued by the European Patent Office in counterpart European Application No. 09821752.4.

US Office Action issued in corresponding U.S. Appl. No. 13/123,803 dated Apr. 4, 2012.

US Office Action issued in corresponding U.S. Appl. No. 13/123,803 dated Oct. 25, 2012.

* cited by examiner

METHOD, SYSTEM OF PERFORMING HAND OVER WITHOUT ADDING INFORMATION OF FEMTO BASE STATION TO PERIPHERAL BASE STATION ANNOUNCEMENT INFORMATION IN A WIRELESS COMMUNICATION NETWORK

This is a Continuation application based upon U.S. patent application Ser. No. 13/123,803 filed Apr. 12, 2011, which is a National Stage of International Application No. PCT/JP2009/005193 filed Oct. 6, 2009, claiming priority based on Japanese Patent Application No. 2008-269995 filed Oct. 20, 2008, the contents of all of which are incorporated herein by reference in their entirety.

The present invention relates to a communication system, a secondary base station, a wireless communication method, a communication program, a communication circuit, and a wireless relay apparatus.

TECHNICAL FIELD

1. Background Art

Generally, a mobile communication system includes multiple base stations, each having a wide communication area, so as to implement wide area communication. However, since the intensity of radio waves from each base station degrades under ground or inside a building, communication may be difficult in such conditions. In order to solve this problem, a secondary base station called a "pico base station" or "femto base station" having a small communication area is used.

FIG. 9 is a diagram showing the structure of an ordinary communication system having a femto base station.

The communication system includes a peripheral base station 910, a terminal 920, and a femto base station 930.

The service frequency of the peripheral base station 910 is α, and the service frequency of the femto base station 930 is γ.

FIG. 10 is a sequence chart showing the operation of the ordinary communication system.

First, the peripheral base station 910 generates peripheral base station announcement information which includes adjacent cell information (see step S91). The adjacent cell information includes information about the femto base station 930.

When generating the peripheral base station announcement information, the peripheral base station 910 sends the generated peripheral base station announcement information by using a frequency α at a regular transmission timing (see step S92).

When the peripheral base station 910 sends the peripheral base station announcement information, the terminal 920 receives the peripheral base station announcement information from the peripheral base station 910 by using the frequency α (see step S93).

In the above process, the terminal 920 belongs to a communication area covered by the peripheral base station 910.

When receiving the peripheral base station announcement information, the terminal 920 performs an adjacent call search where target adjacent cells include the femto base station 930 (see step S94).

The femto base station 930 sends femto base station announcement information by using a frequency γ at a regular transmission timing (see step S95).

When the terminal 920 performs the adjacent call search in step S94, the terminal 920 receives the femto base station announcement information from the femto base station 930 by using the frequency γ (see step S96).

In this process, if the terminal 920 receives stronger radio waves from the femto base station 930 than those from the peripheral base station 910, the terminal 920 changes the communication area to which it belongs, from that of the peripheral base station 910 to that of the femto base station 930, so that communication via the femto base station 930 can be performed.

If the terminal 920 receives stronger radio waves from the peripheral base station 910 than those from the femto base station 930, the terminal 920 does not change the communication area to which it belongs, and performs communication via the peripheral base station 910.

Patent Document 1 discloses a technique for updating adjacent cell information included in the peripheral base station information which is sent by the peripheral base station 910.

2. Prior Art Document

Patent Document

Patent Document 1: Japanese Unexamined Patent Application, First Publication No. 2008-219645.

DISCLOSURE OF INVENTION

Problem to be Solved by the Invention

In the above-described communication system, if the femto base station 930 is not included in an adjacent cell list stored by the peripheral base station 910, information of the femto base station 930 is not included in the adjacent cell information of the peripheral base station announcement information generated by the peripheral base station 910.

In such a case, when the terminal 920 belongs to the communication area of the peripheral base station 910, the femto base station 930 is not a target for the adjacent cell search, so that the terminal 910 cannot belong to the communication area of the femto base station 930.

In light of the above circumstances, an object of the present invention is to provide a communication system, a secondary base station, a wireless communication method, a communication program, a communication circuit, and a wireless relay apparatus, by which the communication area of a mobile terminal (or a terminal) can be changed from that of a primary base station (peripheral base station) to that of a secondary base station (femto base station) without adding information of the secondary base station to adjacent cell information in announcement information (or peripheral base station announcement information) send by the primary base station.

Although the above-described problem to be solved by the invention was explained about a femto base station as an example, a similar problem occurs for an ordinary base station or a communication apparatus which functions as a base station.

Means for Solving the Problem

In order to solve the above-described problem, the present invention provides a communication system in which a primary base station or a secondary base station communicates with a mobile terminal, wherein:

the primary base station sends the mobile terminal and the secondary base station an announcement signal which includes identification information for identifying a cell of the primary base station;

when receiving the announcement signal, the secondary base station sends the mobile terminal a pseudo announcement signal which includes the identification information and adjacent cell information which includes information for a cell of the secondary base station; and when receiving the announcement signal and the pseudo announcement signal, the mobile terminal compares a reception power of the signal received from the primary base station with that of the signal received from the secondary base station, and performs communication with one of the base stations which has higher power.

The present invention also provides a communication system that includes a mobile terminal, a primary base station which communicates with the mobile terminal by using a first frequency, and a secondary base station which communicates with the primary base station and the mobile terminal by using the first frequency and also communicates with the mobile terminal by using a second frequency different from the first frequency, wherein:

the primary base station sends an announcement signal to the mobile terminal and the secondary base station;

when receiving the announcement signal from the primary base station, the secondary base station sends the mobile terminal a pseudo announcement signal including identification information which indicates the secondary base station, by using the first frequency; and the mobile terminal compares a reception power of the announcement signal received from the primary base station with that of the pseudo announcement signal received from the secondary base station, and performs communication with one of the base stations which has higher power.

The present invention also provides a secondary base station comprising:

a receiving unit that receives an announcement signal which includes identification information for identifying a cell of a primary base station;

a generation unit that generates, when the announcement signal is received, a pseudo announcement signal which includes the identification information and adjacent cell information which includes information for a cell of the secondary base station; and a sending unit that sends the generated pseudo announcement signal to a mobile terminal.

The present invention also provides a secondary base station that communicates by using a first frequency, with a mobile terminal and a primary base station which communicates with the mobile terminal by using the first frequency, where the secondary base station also communicates with the mobile terminal by using a second frequency different from the first frequency, wherein:

when receiving an announcement signal from the primary base station, the secondary base station sends the mobile terminal a pseudo announcement signal including identification information which indicates the secondary base station, by using the first frequency; and the secondary base station performs communication with the mobile terminal by using the second frequency if a power of the pseudo announcement signal received by the mobile terminal is higher than a power of the announcement signal received by the mobile terminal.

The present invention also provides a wireless communication method used in a communication system in which a primary base station or a secondary base station communicates with a mobile terminal, the method comprising:

a step in which the primary base station sends the mobile terminal and the secondary base station an announcement signal which includes identification information for identifying a cell of the primary base station;

a step in which when receiving the announcement signal, the secondary base station sends the mobile terminal a pseudo announcement signal which includes the identification information and adjacent cell information which includes information for a cell of the secondary base station; and a step in which when receiving the announcement signal and the pseudo announcement signal, the mobile terminal compares a reception power of the signal received from the primary base station with that of the signal received from the secondary base station, and performs communication with one of the base stations which has higher power.

The present invention also provides a wireless communication method comprising:

a step that receives an announcement signal which includes identification information for identifying a cell of a primary base station;

a step that generates, when the announcement signal is received, a pseudo announcement signal which includes the identification information and adjacent cell information which includes information for a cell of a present base station; and a step that sends the generated pseudo announcement signal to a mobile terminal.

The present invention also provides a communication program that makes a wireless base station execute:

a process that receives an announcement signal which includes identification information for identifying a cell of a primary base station;

a process that generates, when the announcement signal is received, a pseudo announcement signal which includes the identification information and adjacent cell information which includes information for a cell of the wireless base station; and a process that sends the generated pseudo announcement signal to a mobile terminal.

The present invention also provides a communication circuit provided in a wireless communication apparatus, wherein the communication circuit:

receives an announcement signal which includes identification information for identifying a cell of a primary base station;

generates, when the announcement signal is received, a pseudo announcement signal which includes the identification information and adjacent cell information which includes information for a cell of the wireless base station; and sends the generated pseudo announcement signal to a mobile terminal.

The present invention also provides a wireless relay apparatus comprising:

a receiving unit that receives an announcement signal which includes identification information for identifying a cell of a primary base station;

a generation unit that generates, when the announcement signal is received, a pseudo announcement signal which includes the identification information and adjacent cell information which includes information for a cell of the wireless relay apparatus; and a sending unit that sends the generated pseudo announcement signal to a mobile terminal.

Effect of the Invention

When a mobile terminal belongs to the communication area of a primary base station and receives an announcement signal which includes the identification information for the cell of the primary base station, if the radio waves of a pseudo announcement signal sent by a secondary base station is stronger for the mobile terminal than those of an announcement signal sent by the primary base station, then the mobile terminal can receive the pseudo announcement signal from the secondary base station and change the communication area, to which it belongs, to the communication area of the secondary base station.

Accordingly, it is possible to switch the communication area, to which the mobile terminal belongs to, from that of the primary base station to that of the secondary base station, without registering the secondary base station in adjacent cell information included in the announcement information sent by the primary base station.

BRIEF DESCRIPTION OF THE DRAWINGS

FIG. 6 is a diagram showing relationships between the distance and the reception electric field for the peripheral base station and the femto base station and.

MODE FOR CARRYING OUT THE INVENTION

Below, embodiments of the present invention will be explained in detail with reference to the drawings.

First Embodiment

Figure 1:
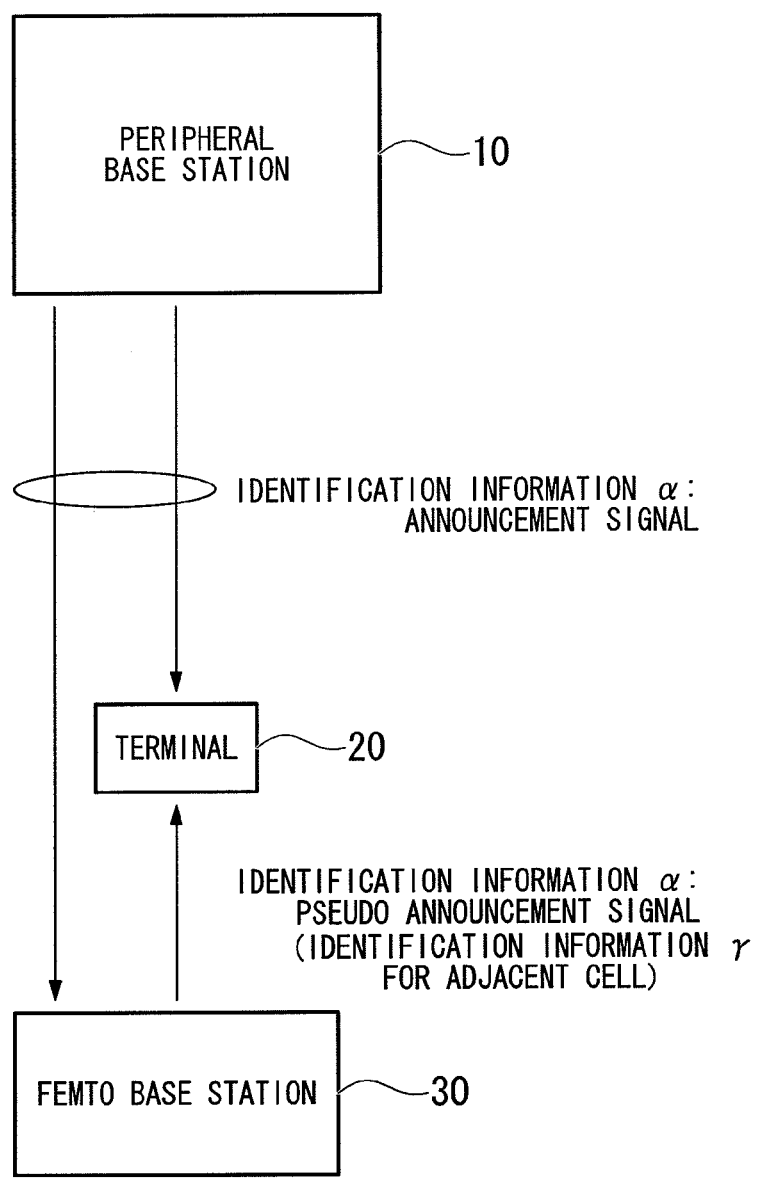
FIG. 1 is a general diagram showing a communication system as a first embodiment of the present invention.

FIG. 1 is a general diagram showing a communication system as a first embodiment of the present invention.

The communication system includes a peripheral base station 10 (i.e., a primary base station), a terminal 20 (i.e., a mobile terminal), and a femto base station 30 (i.e., a secondary base station).

Identification information for the communication area (i.e., cell) of the peripheral base station 10 is indicated by α.

The peripheral base station 10 sends an announcement signal (or announcement information) including the identification information α to the terminal 20 and the femto base station 30.

Identification information for the cell of the femto base station 30 is indicated by γ.

When receiving the announcement signal, the femto base station 30 sends the terminal 20 a pseudo announcement signal which includes the identification information α and adjacent cell information which is defined to be the identification information γ for the cell of the femto base station 30.

When receiving the announcement signal and the pseudo announcement signal, the terminal 20 compares a reception (electric) power of the signal received from the peripheral base station 10 with that of the signal received from the femto base station 30, and performs communication with any one of the base stations which provides higher reception power.

Therefore, when the terminal 20 belongs the communication area (i.e., cell) of the peripheral base station 10 and receives the announcement signal including the identification information for the cell of the peripheral base station 10, if the radio waves of the pseudo announcement signal sent by the femto base station 30 is stronger than those of the announcement signal sent by the peripheral base station 10, then the terminal 20 can receive the pseudo announcement signal from the femto base station 30 and change the communication area, to which it belongs, to the communication area of the femto base station 30.

In the present invention, the identification information is information for identifying the relevant communication area (i.e., cell), and may be a frequency or spread code, or a combination thereof.

The spread code may be a channelization code or scrambling code.

Although the identification information is used here, it is not a limiting condition, and any information for identifying the relevant cell can be used.

Also in the present invention, the adjacent cell information indicates identification information for any peripheral cell of the target communication area (i.e., cell).

For example, in the present embodiment, the adjacent cell information indicates identification information (a frequency or spread code, or a combination thereof) for at least one peripheral cell of the peripheral base station 10.

Second Embodiment

Figure 2:
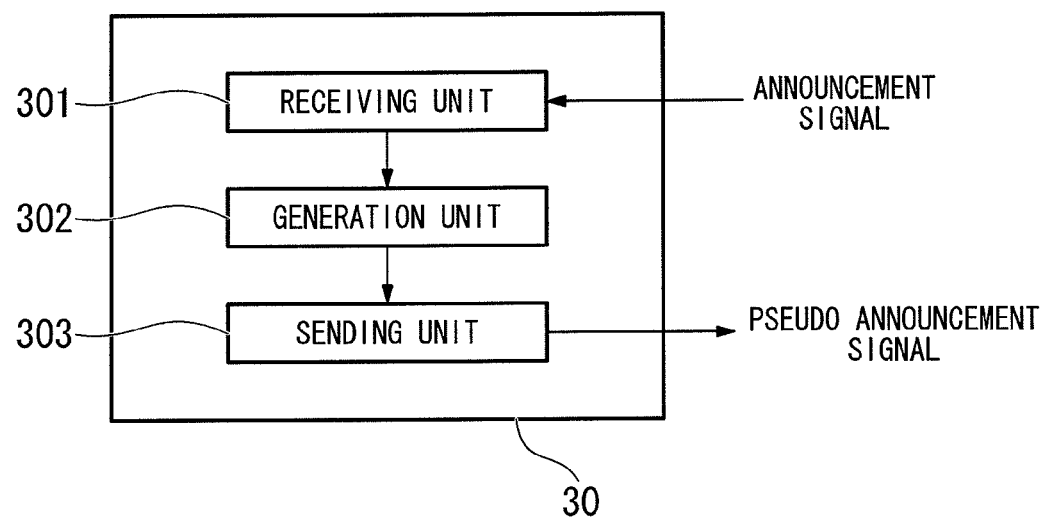
FIG. 2 is a general block diagram showing the structure of a femto base station as a second embodiment of the present invention.

FIG. 2 is a general block diagram showing the structure of a femto base station as a second embodiment of the present invention.

The shown femto base station 30 includes at least a receiving unit 301, a generation unit 302, and a sending unit 303.

The receiving unit 301 receives an announcement signal which includes identification information (e.g., frequency) for identifying the cell of the peripheral base station 10.

Based on the announcement signal received by the receiving unit 301, the generation unit 302 generates a pseudo announcement signal which includes (i) adjacent cell information which has information for the cell of the femto base station 30 itself and (ii) identification information for the cell of the peripheral base station 10.

The sending unit 303 sends the pseudo announcement signal generated by the generation unit 302, based on the identification information for the cell of the peripheral base station 10.

Therefore, when the terminal 20 belongs to the communication area (i.e., cell) of the peripheral base station 10 and receives the announcement signal which includes the identification information of the peripheral base station 10, if the radio waves of the pseudo announcement signal sent by the femto base station 30 is stronger than those of the announcement signal sent by the peripheral base station 10, then the terminal 20 can receive the pseudo announcement signal from the femto base station 30 and change the communication area, to which it belongs, to the communication area of the femto base station 30.

Third Embodiment

Figure 3:
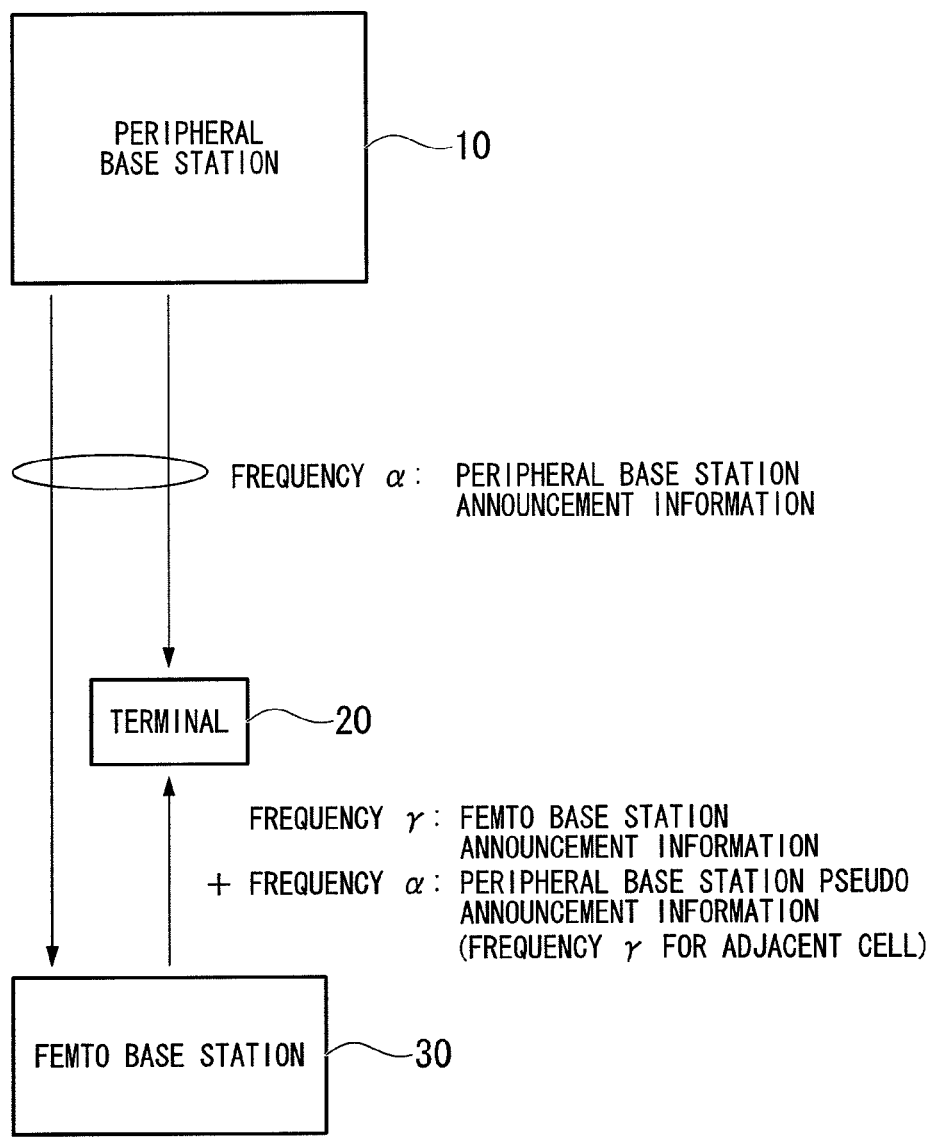
FIG. 3 is a diagram showing the structure of a communication system as a third embodiment of the present invention.

FIG. 3 is a diagram showing the structure of a communication system as a third embodiment of the present invention.

The communication system includes a peripheral base station 10 (i.e., a primary base station), a terminal 20 (i.e., a mobile terminal), and a femto base station 30 (i.e., a secondary base station).

The peripheral base station 10 has a service frequency α (as a first frequency).

The femto base station 30 sends femto base station announcement information, and has a service frequency γ (as a second frequency).

Figure 4:
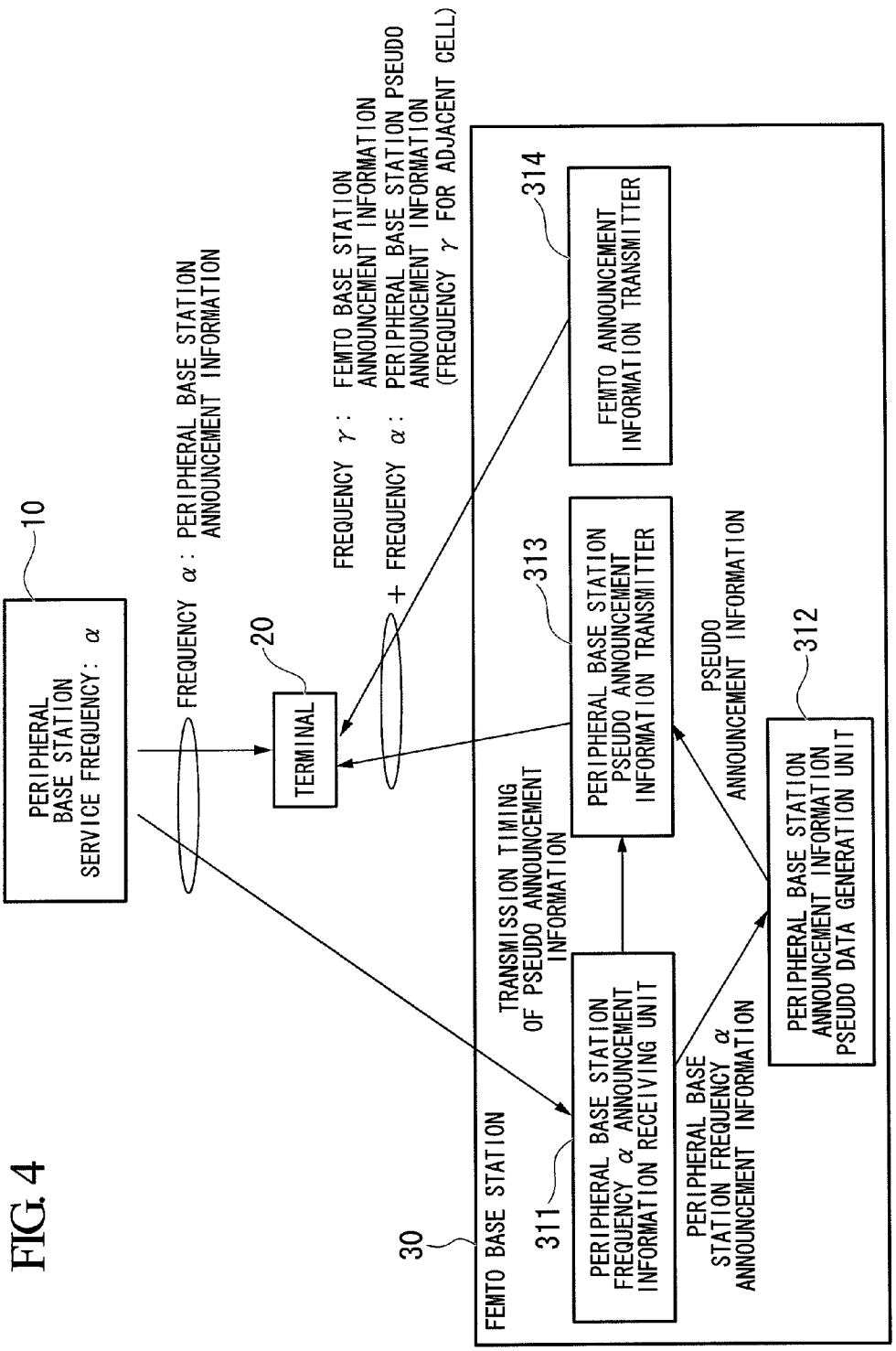
FIG. 4 is a general block diagram showing the structure of the femto base station in the third embodiment.

FIG. 4 is a general block diagram showing the structure of the femto base station in the third embodiment of the present invention.

The shown femto base station 30 includes a peripheral base station frequency α announcement information receiving unit 311, a peripheral base station announcement information pseudo data generation unit 312, a peripheral base station pseudo announcement information transmitter 313, and a femto announcement information transmitter 314.

The peripheral base station frequency α announcement information receiving unit 311 receives peripheral base station announcement information sent by the peripheral base station 10 by using frequency α.

Based on the peripheral base station announcement information received by the peripheral base station frequency α announcement information receiving unit 311, the peripheral base station announcement information pseudo data generation unit 312 generates peripheral base station pseudo announcement information.

The peripheral base station pseudo announcement information transmitter 313 sends the peripheral base station pseudo announcement information generated by the peripheral base station announcement information pseudo data generation unit 312, by using frequency α.

The femto announcement information transmitter 314 sends femto base station announcement information by using frequency γ. Additionally, adjacent cell information is defined to be frequency γ of the femto base station 30.

Below, the operation of the communication system of the third embodiment will be explained.

In the present embodiment, the terminal 20 receives stronger radio waves from the femto base station 30 than those from the peripheral base station 10.

Figure 5:
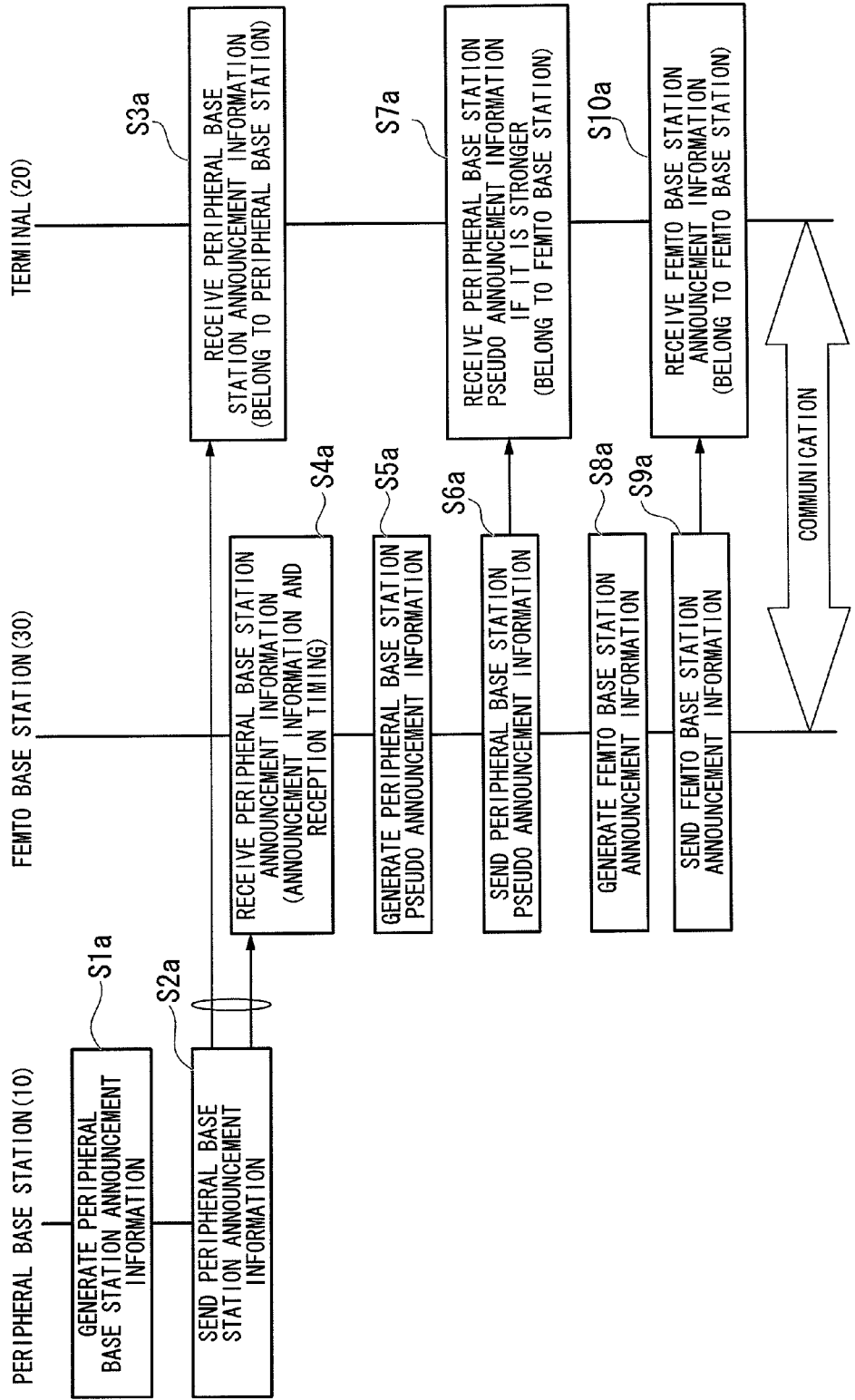
FIG. 5 is a sequential chart showing the operation of the communication system in the third embodiment.

FIG. 5 is a sequential chart showing the operation of the present communication system.

First, the peripheral base station 10 generates peripheral base station announcement information (see step S1a).

The following explanation employs a case in which adjacent cell information in this peripheral base station announcement information includes no information for the femto base station 30.

After generating the peripheral base station announcement information, the peripheral base station 10 sends the generated peripheral base station announcement information by using a frequency α at a regular transmission timing (see step S2a).

When the peripheral base station 10 sends the peripheral base station announcement information, the terminal 20 receives the peripheral base station announcement information from the peripheral base station 10 at frequency α (see step S3a).

At this time point, the terminal 20 belongs to the communication area of the peripheral base station 10.

Also when the peripheral base station 10 sends the peripheral base station announcement information in step S2a, the peripheral base station frequency α announcement information receiving unit 311 of the femto base station 30 receives the peripheral base station announcement information sent by the peripheral base station 10 by using frequency α, thereby obtaining the peripheral base station announcement information of the peripheral base station 10 and the reception timing thereof (see step S4a).

The reception timing may be obtained by receiving the peripheral base station announcement information (by the peripheral base station frequency α announcement information receiving unit 311) from the peripheral base station 10 multiple times, and computing an average of reception intervals.

When the peripheral base station frequency α announcement information receiving unit 311 receives the peripheral base station announcement information, the peripheral base station announcement information pseudo data generation unit 312 generates peripheral base station pseudo announcement information by modifying the adjacent cell information of the peripheral base station announcement information so that the adjacent cell information includes information about the femto base station 30 (see step S5a).

When the peripheral base station announcement information pseudo data generation unit 312 generates the peripheral base station pseudo announcement information, the peripheral base station pseudo announcement information transmitter 313 sends the peripheral base station pseudo announcement information generated by the peripheral base station announcement information pseudo data generation unit 312, by using frequency α at a transmission timing corresponding to the reception timing of the peripheral base station announcement information, which was obtained by the peripheral base station frequency α announcement information receiving unit 311 and corresponds to the above-described regular transmission timing (see step S6a).

Accordingly, the femto base station 30 can send the peripheral base station pseudo announcement information in synchronism with the peripheral base station announcement information sent by the peripheral base station 10.

When the femto base station 30 sends the peripheral base station pseudo announcement information, if radio waves for the peripheral base station announcement information sent by the femto base station 30 are stronger at the terminal 20 than those for the peripheral base station announcement information sent by the peripheral base station 10, the terminal 20 receives the peripheral base station pseudo announcement information from the femto base station 30 at frequency α, and changes the communication area, to which the terminal 20 belongs, to that of the femto base station 30 (see step S7a).

Accordingly, the terminal 20 stands by for reception of an announcement signal at a frequency γ.

The femto announcement information transmitter 314 generates femto base station announcement information (see step S8a), and sends the generated femto base station announcement information by using frequency γ (see step S9a).

After the femto announcement information transmitter 314 sends the femto base station announcement information and the terminal 20 changes the communication area, to which it belongs, to that of the femto base station 30 (see the above step S7a), the terminal 20 can receive the femto base station announcement information at frequency γ (see step S10a).

Accordingly, the terminal 20 can perform communication via the femto base station 30.

If radio waves for the peripheral base station announcement information sent by the peripheral base station 10 are stronger at the terminal 20 than those for the peripheral base station announcement information sent by the femto base station 30 in the above step S7a, the terminal 20 does not change the communication area, to which it belongs, and performs communication via the peripheral base station 10.

In such a case, the terminal 20 does not stand by for the announcement signal reception at frequency γ, and thus cannot receive the femto base station announcement information in step S10a.

Figure 6:
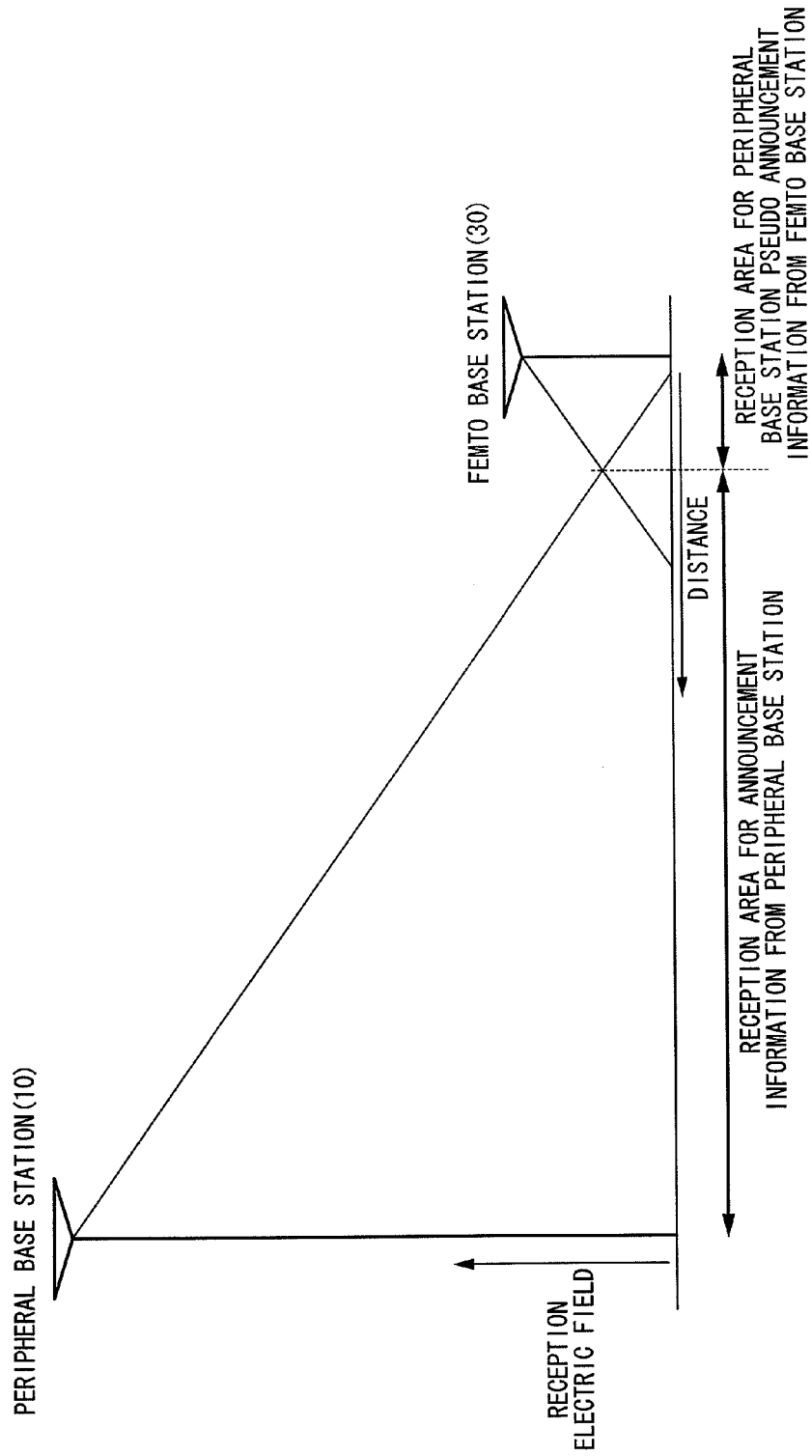

FIG. 6 is a diagram showing relationships between the distance and the reception electric field for the peripheral base station and the femto base station and.

As shown in FIG. 6, the reception intensity of radio waves emitted from the peripheral base station 10 gradually decreases as the distance from the peripheral base station 10 increases. Similarly, the reception intensity of radio waves emitted from the femto base station 30 gradually decreases as the distance from the femto base station 30 increases.

In the operation explained above, the terminal 20 receives stronger radio waves from the femto base station 30 than those from the peripheral base station 10, that is, the terminal 20 is present in a reception area (see FIG. 6) for the peripheral base station pseudo announcement information from the femto base station.

As described above, in accordance with the present embodiment, the peripheral base station announcement information pseudo data generation unit 312 generates the peripheral base station pseudo announcement information by modifying the adjacent cell information of the peripheral base station announcement information so that the adjacent cell information includes information about the femto base station 30. The peripheral base station pseudo announcement information transmitter 313 sends the generated information by using frequency α.

Therefore, when the terminal 20 belongs to the communication area of the peripheral base station 10 and receives announcement information at frequency α, if the radio waves for the peripheral base station announcement information sent by the femto base station 30 are stronger at the terminal 20 than those for the peripheral base station announcement information sent by the peripheral base station 10, the terminal 20 receives the peripheral base station pseudo announcement information from the femto base station 30 at frequency α, and changes the communication area, to which the terminal 20 belongs, to that of the femto base station 30.

Accordingly, it is possible to switch the communication area, to which the terminal 20 belongs to, from that of the peripheral base station 10 to that of the femto base station 30, without registering the femto base station 30 in the adjacent cell information of the peripheral base station announcement information sent by the peripheral base station 10.

That is, when providing a new femto base station 30, it is unnecessary for an operator to manually perform a complex work for registering information about the relevant femto base station 30 in the adjacent cell information of the peripheral base station 10 so as to update the adjacent cell information. In addition, when a femto base station 30 is provided, communication via the femto base station 30 can be immediately started.

Fourth Embodiment

Figure 7:
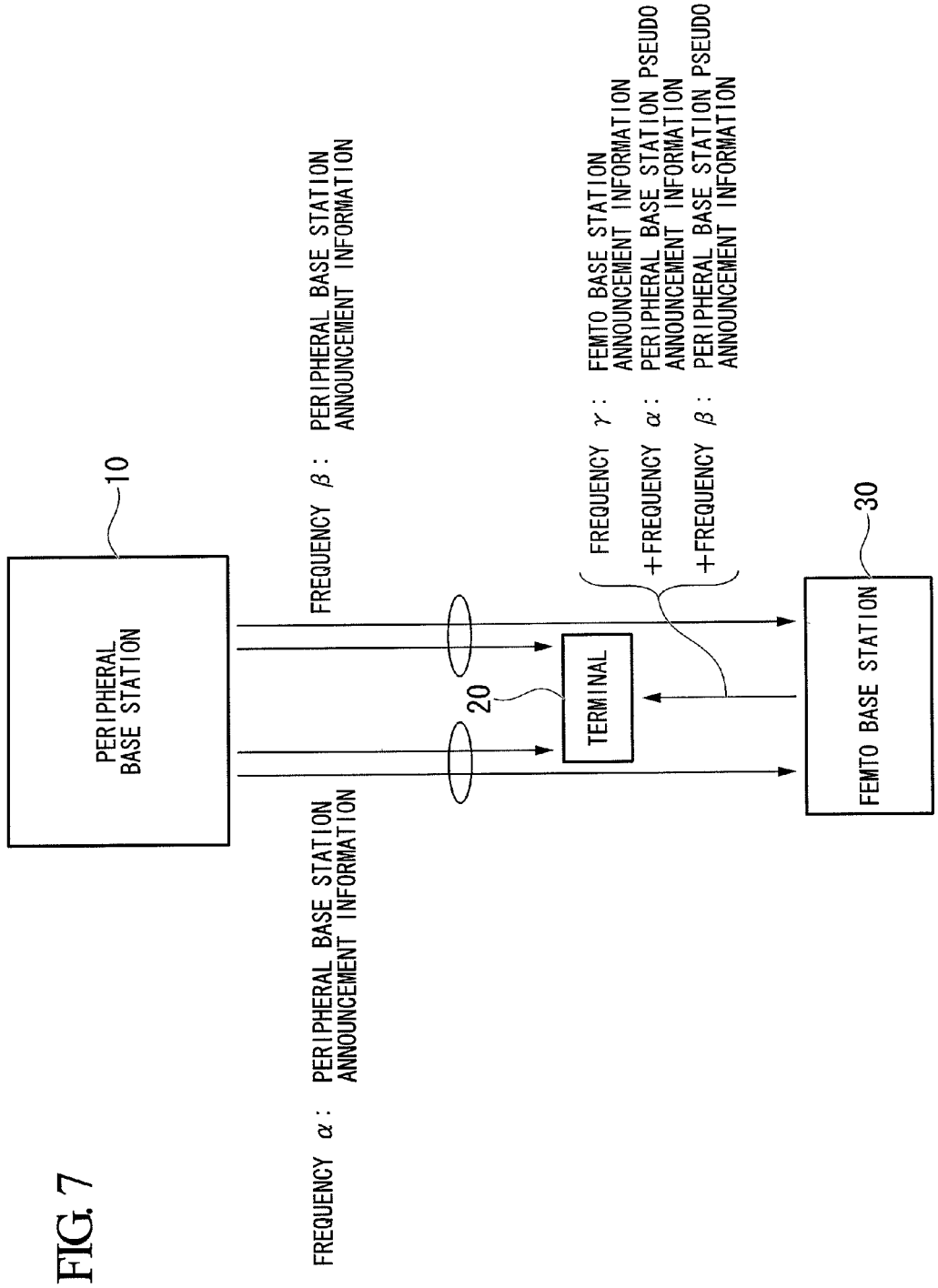
FIG. 7 is a diagram showing the structure of a communication system as a fourth embodiment of the present invention.

FIG. 7 is a diagram showing the structure of a communication system as a fourth embodiment of the present invention.

The fourth embodiment employs a case in which the peripheral base station has two service frequencies.

The communication system includes a peripheral base station 10, a terminal 20, and a femto base station 30.

The service frequencies of the peripheral base station 10 are α and β, the service frequency of the femto base station 30 is γ.

Although it is not shown, the femto base station 30 includes a peripheral base station frequency αβ announcement signal receiving unit 321 in place of the peripheral base station frequency α announcement information receiving unit 311 of the femto base station 30 in the third embodiment.

Below, the operation of the communication system of the fourth embodiment will be explained.

Similar to the third embodiment, in the present embodiment, the terminal 20 receives stronger radio waves from the femto base station 30 than those from the peripheral base station 10.

Figure 8:
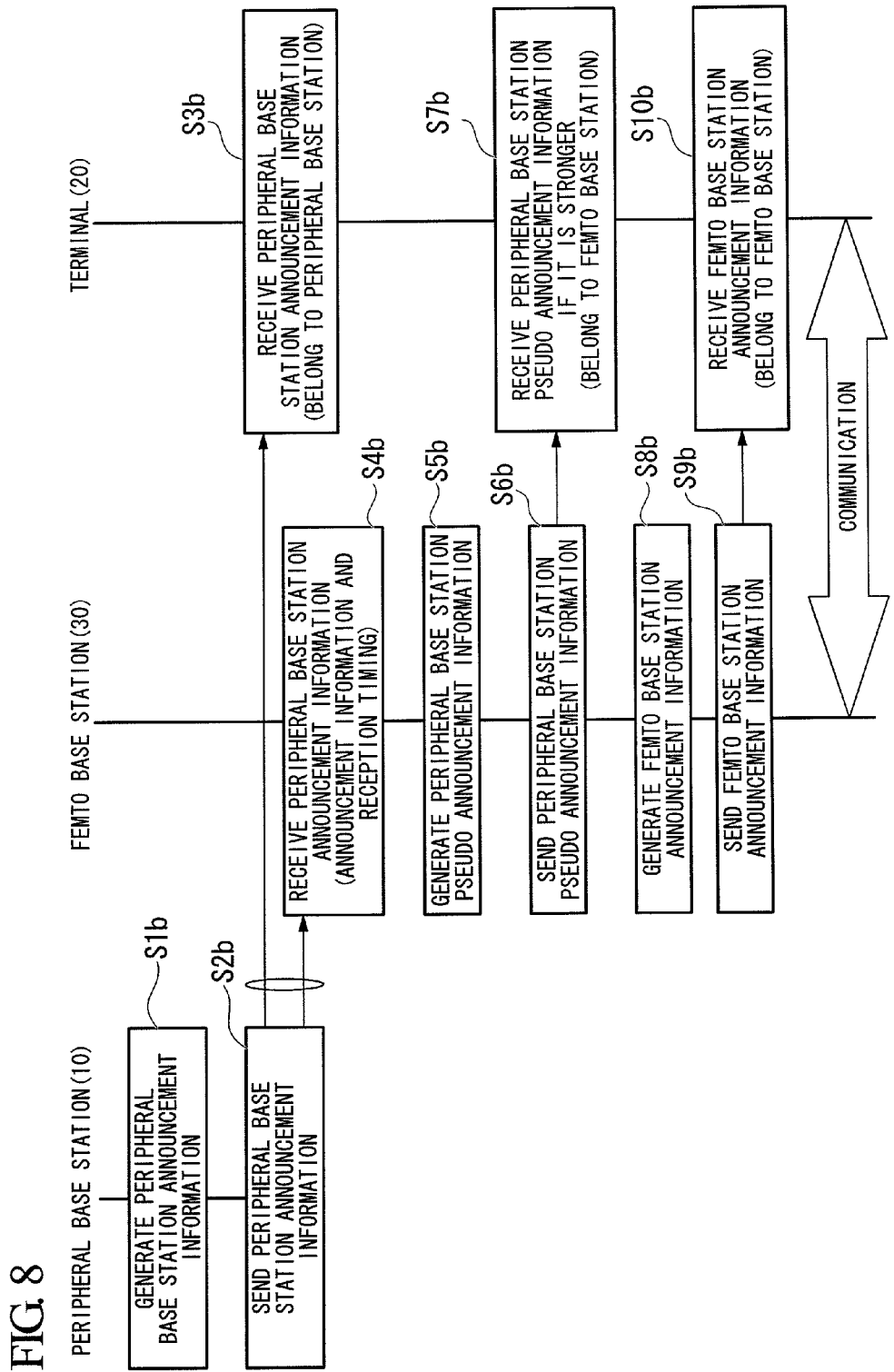
FIG. 8 is a sequential chart showing the operation of the communication system in the fourth embodiment.
Figure 9:
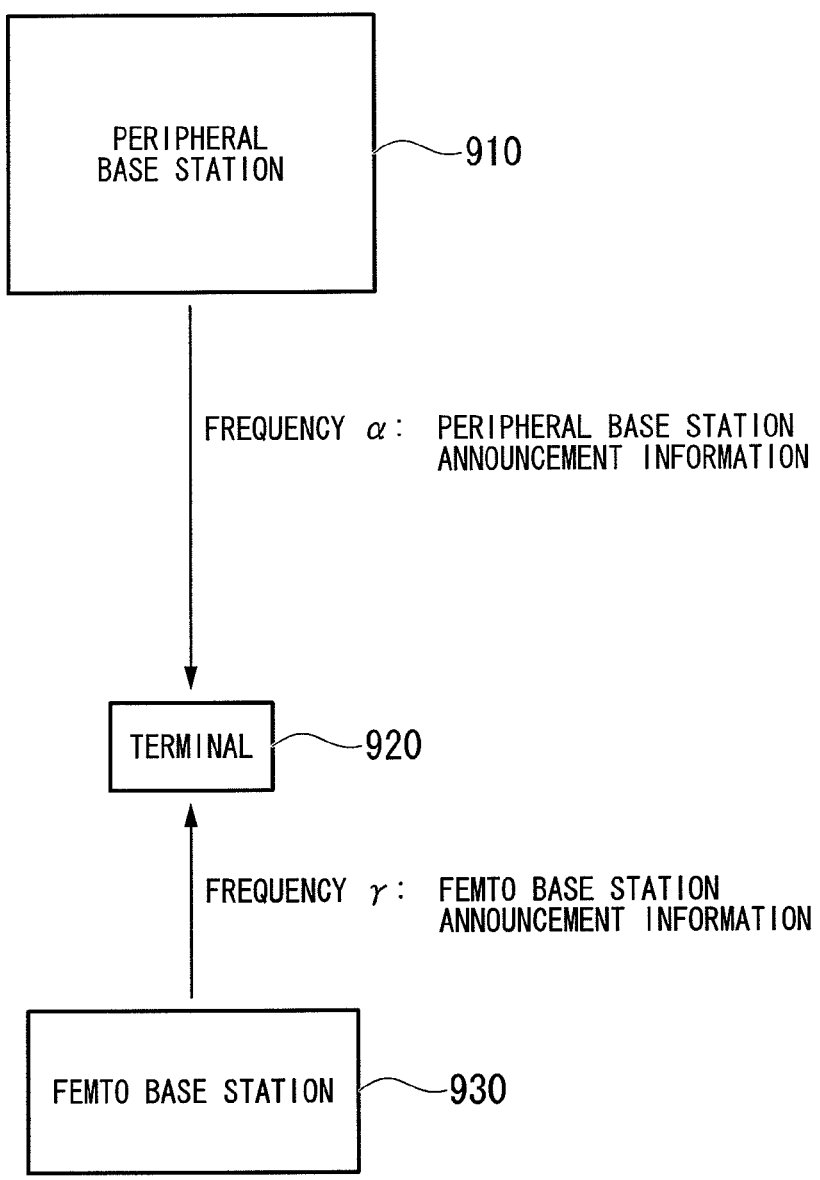
FIG. 9 is a diagram showing the structure of an ordinary communication system having a femto base station.
Figure 10:
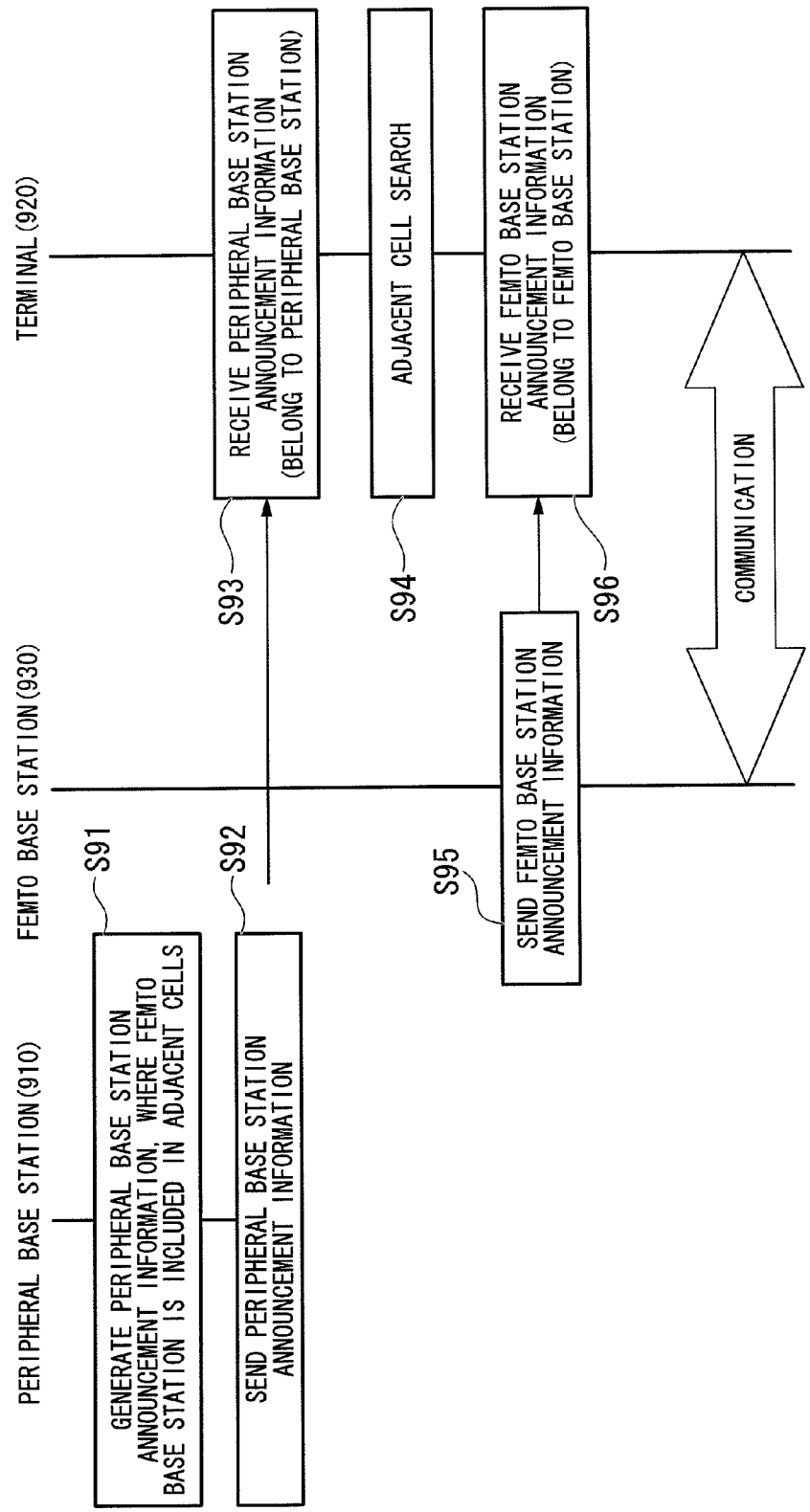
FIG. 10 is a sequence chart showing the operation of the ordinary communication system.

FIG. 8 is a sequential chart showing the operation of the present communication system.

First, the peripheral base station 10 generates peripheral base station announcement information (see step S1b).

The following explanation employs a case in which adjacent cell information in this peripheral base station announcement information includes no information for the femto base station 30.

After generating the peripheral base station announcement information, the peripheral base station 10 sends the generated peripheral base station announcement information by using frequencies α and β at a regular transmission timing (see step S2b).

When the peripheral base station 10 sends the peripheral base station announcement information, the terminal 20 receives the peripheral base station announcement information from the peripheral base station 10 at frequency α or β (see step S3b). At this time point, the terminal 20 belongs to the communication area of the peripheral base station 10.

Also when the peripheral base station 10 sends the peripheral base station announcement information in step S2b, the peripheral base station frequency αβ announcement signal receiving unit 321 of the femto base station 30 receives the peripheral base station announcement information sent by the peripheral base station 10 by using frequencies α and β, thereby obtaining the peripheral base station announcement information of the peripheral base station 10 and the reception timing thereof (see step S4b).

When the peripheral base station frequency αβ announcement signal receiving unit 321 receives the peripheral base station announcement information, the peripheral base station announcement information pseudo data generation unit 312 generates peripheral base station pseudo announcement information by modifying the adjacent cell information of the peripheral base station announcement information so that the adjacent cell information includes information about the femto base station 30 (see step S5b).

When the peripheral base station announcement information pseudo data generation unit 312 generates the peripheral base station pseudo announcement information, the peripheral base station pseudo announcement information transmitter 313 sends the peripheral base station pseudo announcement information generated by the peripheral base station announcement information pseudo data generation unit 312, by using frequencies α and β at a transmission timing corresponding to the reception timing of the peripheral base station announcement information, which was obtained by the peripheral base station frequency αβ announcement signal receiving unit 321 (see step S6b).

Accordingly, the femto base station 30 can send the peripheral base station pseudo announcement information in synchronism with the peripheral base station announcement information sent by the peripheral base station 10.

When the femto base station 30 sends the peripheral base station pseudo announcement information, if radio waves for the peripheral base station announcement information sent by the femto base station 30 are stronger at the terminal 20 than those for the peripheral base station announcement information sent by the peripheral base station 10, the terminal 20 receives the peripheral base station pseudo announcement information from the femto base station 30 at frequency α or β, and changes the communication area, to which the terminal 20 belongs, to that of the femto base station 30 (see step S7b).

Accordingly, the terminal 20 stands by for reception of an announcement signal at a frequency γ.

The femto announcement information transmitter 314 generates femto base station announcement information (see step S8b), and sends the generated femto base station announcement information by using frequency γ (see step S9b).

After the femto announcement information transmitter 314 sends the femto base station announcement information and the terminal 20 changes the communication area, to which it belongs, to that of the femto base station 30 (see the above step S7b), the terminal 20 can receive the femto base station announcement information at frequency γ (see step S10b).

Accordingly, the terminal 20 can perform communication via the femto base station 30.

If radio waves for the peripheral base station announcement information sent by the peripheral base station 10 are stronger at the terminal 20 than those for the peripheral base station announcement information sent by the femto base station 30 in the above step S7b, the terminal 20 does not change the communication area to which it belongs and performs communication via the peripheral base station 10.

In such a case, the terminal 20 does not stand by for the announcement signal reception at frequency γ, and thus cannot receive the femto base station announcement information in step S10b.

As described above, in accordance with the fourth embodiment, the femto base station 30 sends the peripheral base station pseudo announcement information by using frequencies α and β in conformation with the peripheral base station 10.

Therefore, the terminal 20 can change the communication area, to which it belongs, to that of the femto base station 30 when the terminal 20 performs the relevant reception at either frequency of α or β.

Although the first, second, third, and fourth embodiments were explained with reference to the drawings, specific structures are not limited to those explained above, and various design modifications or the like are possible within the scope of the present invention.

For example, although the secondary base station is the femto base station 30 in the first, second, third, and fourth embodiments, it is not a limiting condition, and another base station such as a nano or pico base station alignment may be the secondary base station.

In addition, although the peripheral base station 10 uses two service frequencies in the fourth embodiment, it is not a limiting condition, and the peripheral base station 10 may use three or more service frequencies.

Additionally, although one peripheral base station 10, one terminal 20, and one femto base station 30 are provided in the first, second, third, and fourth embodiments, it is not a limiting condition, and a plurality of peripheral base stations 10, terminals 20, and femto base stations 30 may be provided, which provides similar effects.

If employing such a "plurality" configuration, each terminal 20 belongs to the communication area of one of the base stations which include peripheral base stations 10 and the femto base stations 30, which emits strongest radio waves. The terminal 20 thus performs communication via the relevant base station.

The femto base station 30 includes a computer system.

Each of the above-described processes is stored as a program format in a computer-readable storage medium, and executed when the relevant computer loads and executes the program.

The computer-readable storage medium may be a magnetic disk, a magneto-optical disk, a CD-ROM, a DVD-ROM, or a semiconductor memory. Such a computer program may be provided to a computer via a communication line, and the computer which receives the program may execute the program.

In addition, a program for performing a portion of the above-explained processes may be used. Furthermore, a differential file (i.e., a differential program) to be combined with a program which has already been stored in the computer system may be provided to realize the above processes.

In the above-described embodiments, an announcement signal (announcement information) which includes the identification information for the cell of the peripheral base station 10 is sent to the femto base station 30. However, the announcement signal (announcement information) of the present invention may be sent by means of wire or wireless communication from an upper node in an RCN (radio network controller) or a CN (core network).

The above-described femto base station can be applied, not only to a W-CDMA method, but also a cdma2000 or LTE (long term evolution) method. For example, in the LTE method, the identification information for identifying the cell is a frequency (EUTRA-DL-CarrierFreq) or a physical cell identification number (physical cell identity).

In addition, although the femto base station 30 (secondary base station) is a base station, it may be used as a communication apparatus having similar functions.

For example, the femto base station 30 in accordance with the present invention can be used as a repeater apparatus (i.e., wireless relay apparatus). This repeater apparatus may be used for not only directly relaying a signal sent from a base station or mobile terminal, but also relays a future signal via another repeater apparatus.

In addition, elements which execute respective functions of the above-described peripheral base station frequency α announcement information receiving unit 311, peripheral base station announcement information pseudo data generation unit 312, peripheral base station pseudo announcement information transmitter 313, and femto announcement information transmitter 314 of the femto base station 30 may be integrated on a semiconductor substrate so as to implement a communication circuit.

INDUSTRIAL APPLICABILITY

When a mobile terminal belongs to the communication area of a primary base station and receives an announcement signal which includes the identification information for the cell of the primary base station, if the radio waves of a pseudo announcement signal sent by a secondary base station is stronger for the mobile terminal than those of an announcement signal sent by the primary base station, then the mobile terminal can receive the pseudo announcement signal from the secondary base station and change the communication area, to which it belongs, to the communication area of the secondary base station. Accordingly, it is possible to switch the communication area, to which the mobile terminal belongs to, from that of the primary base station to that of the secondary base station, without registering the secondary base station in adjacent cell information included in the announcement information sent by the primary base station.

REFERENCE SYMBOLS 10 peripheral base station
20 terminal
30 femto base station
301 receiving unit
302 generation unit
303 sending unit
311 peripheral base station frequency α announcement information receiving unit 311
312 peripheral base station announcement information pseudo data generation unit
313 peripheral base station pseudo announcement information transmitter
314 femto announcement information transmitter

The invention claimed is:

1. A femto base station in a wireless communication system that includes a mobile terminal, a base station having a first cell, and the femto base station having a second cell,
   wherein the femto base station is configured to send a signal using a first frequency used in the first cell to which the mobile terminal is connected,
   wherein the signal enables the mobile terminal to connect to the second cell, and
   wherein the second cell is a femtocell, and
   wherein the femto base station is configured to communicate with the mobile terminal, which is connected to the second cell, by using a second frequency that differs from the first frequency.

2. A wireless communication method executed by a femto base station, the method comprising:
   a first operation, comprising sending, by the femto base station, a signal using a first frequency used in a first cell to which a mobile terminal is connected,
      wherein the signal enables the mobile terminal to connect to a second cell, and
      wherein the second cell is a femtocell; and
   a second operation comprising communicating, by the femto base station, with the mobile terminal, which is connected to the second cell, by using a second frequency that differs from the first frequency.

3. A non-transitory computer-readable storage medium that stores a wireless communication program executed by a computer in a femto base station, the program comprising:
   a first operation comprising sending, by the femto base station, a signal using a first frequency used in a first cell to which a mobile terminal is connected,
      wherein the signal enables the mobile terminal to connect to a second cell, and
      wherein the second cell is a femtocell; and
   a second operation comprising communicating, by the femto base station, with the mobile terminal, which is connected to the second cell, by using a second frequency that differs from the first frequency.

4. A wireless circuit provided in a femto base station,
   wherein the wireless circuit provided in the femto base station is configured to send a signal using a first frequency used in a first cell to which a mobile terminal is connected,
   wherein the signal enables the mobile terminal to connect to a second cell,
   wherein the second cell is a femtocell, and
   wherein the wireless circuit provided in the femto base station is configured to communicate with the mobile terminal, which is connected the second cell, by using a second frequency that differs from the first frequency.

5. An integrated circuit provided in a femto base station,
   wherein the integrated circuit provided in the femto base station is configured to generate a first signal sent on a first frequency used in a first cell to which a mobile terminal is connected,
   wherein the first signal enables the mobile terminal to connect to a second cell,
   wherein the second cell is a femtocell; and
   wherein the integrated circuit provided in the femto base station is configured to generate a second signal used to communicate with the mobile terminal, which is connected to the second cell, by using a second frequency that differs from the first frequency.

6. A mobile terminal in a wireless communication system that includes a mobile terminal, a base station having a first cell, and a femto base station having a second cell, wherein the mobile terminal comprises:
   a first communication device configured such that, when the mobile terminal is connected to the first cell, the first communication device communicates with the base station using a first frequency;
   a reception device configured such that, when the mobile terminal is connected to the first cell, the reception device receives a signal that is sent, by the femto base station, using the first frequency, to enable the mobile terminal to connect to the second cell,
      wherein the second cell is a femtocell; and
   a second communication device configured such that, when the mobile terminal is connected to the second cell, the second communication device communicates with the femto base station using a second frequency that differs from the first frequency.

7. A wireless communication method executed by a mobile terminal, the method comprising:
   a first communication operation executed when the mobile terminal is connected to a first cell, wherein the first communication operation comprises communicating with a base station using a first frequency;
   a reception operation executed when the mobile terminal is connected to the first cell, wherein the reception operation comprises receiving a signal that is sent by a femto base station using the first frequency to enable the mobile terminal to connect to a second cell,
      wherein the second cell is a femtocell; and
   a second communication operation executed when the mobile terminal is connected to the second cell, wherein the second communication operation comprises communicating with the femto base station using a second frequency that differs from the first frequency.

8. A non-transitory computer-readable storage medium that stores a wireless communication program executed by a computer in a mobile terminal, the program comprising:
   a first communication operation executed when the mobile terminal is connected to a first cell, wherein the first communication operation comprises communicating with a base station using a first frequency;
   a reception operation executed when the mobile terminal is connected to the first cell, wherein the reception operation comprises receiving a signal that is sent by a femto base station using the first frequency to enable the mobile terminal to connect to a second cell; and
   a second communication operation executed when the mobile terminal is connected to the second cell, wherein the second communication operation comprises communicating with the femto base station using a second frequency that differs from the first frequency.

9. A wireless circuit provided in a mobile terminal,
wherein the wireless circuit is configured to, when the mobile terminal is connected to a first cell:
communicate using a first frequency with a base station having the first cell; and
receive a signal that is sent by a femto base station, using the first frequency, to enable the mobile terminal to connect to a second cell; and
wherein the wireless circuit is configured to, when the mobile terminal is connected to the second cell, communicate with the femto base station using a second frequency that differs from the first frequency.

10. An integrated circuit provided in a mobile terminal, wherein the integrated circuit comprises:
a first generation unit, configured such that, when the mobile terminal is connected to a first cell, the first generation unit generates a first signal to communicate with a base station using a first frequency;
a reception unit configured such that, when the mobile terminal is connected to the first cell, the reception unit receives a second signal that is sent by a femto base station using the first frequency to enable the mobile terminal to connect to a second cell; and
a second generation unit configured such that, when the mobile terminal is connected to the second cell, the second generation unit generates a third signal to communicate with the femto base station using a second frequency that differs from the first frequency.

11. A wireless communication system having a mobile terminal, a base station having a first cell, and a femto base station having a second cell,
wherein the base station having the first cell comprises a device that communicates using a first frequency with the mobile terminal which is connected to the first cell,
wherein the femto base station is configured to send a signal using the first frequency used in the first cell to which the mobile terminal is connected,
wherein the signal enables the mobile terminal to connect to the second cell
wherein the femto base station is configured to communicate with the mobile terminal, which is connected to the second cell, by using a second frequency that differs from the first frequency, and
wherein the mobile terminal comprises a third device that receives the signal when the mobile terminal is connected to the first cell.

12. A wireless communication method executed by a wireless communication system having a mobile terminal, a base station having a first cell, and a femto base station having a second cell, the method comprising:
a first operation in which the base station communicates using a first frequency with the mobile terminal which is connected to the first cell;
a second operation in which the femto base station sends a signal using the first frequency to the mobile terminal, wherein the signal enables the mobile terminal to connect to the second cell;
a third operation in which the mobile terminal receives the signal when the mobile terminal is connected to the first cell; and
a fourth operation in which the femto base station communicates with the mobile terminal, which is connected to the second cell, by using a second frequency that differs from the first frequency.

* * * * *